United States Patent
Dai et al.

(10) Patent No.: US 9,251,079 B2
(45) Date of Patent: *Feb. 2, 2016

(54) MANAGING PROCESSOR THREAD ACCESS TO CACHE MEMORY USING LOCK ATTRIBUTES

(75) Inventors: Xiao Jun Dai, Beijing (CN); Subhendu Das, Durham, NC (US); Zhi Gan, Beijing (CN); Zhang Yue, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 940 days.

This patent is subject to a terminal disclaimer.

(21) Appl. No.: 12/952,014

(22) Filed: Nov. 22, 2010

(65) Prior Publication Data

US 2011/0131378 A1  Jun. 2, 2011

(30) Foreign Application Priority Data

Nov. 30, 2009  (CN) .......................... 2009 1 0225833

(51) Int. Cl.
| | | |
|---|---|---|
| G06F 12/00 | (2006.01) | |
| G06F 13/00 | (2006.01) | |
| G06F 13/28 | (2006.01) | |
| G06F 17/30 | (2006.01) | |
| G06F 12/08 | (2006.01) | |
| G06F 12/12 | (2006.01) | |

(52) U.S. Cl.
CPC .......... *G06F 12/0842* (2013.01); *G06F 12/084* (2013.01); *G06F 12/12* (2013.01); *G06F 17/30171* (2013.01); *G06F 12/0844* (2013.01); *G06F 12/0864* (2013.01); *G06F 12/121* (2013.01); *G06F 12/122* (2013.01); *G06F 12/127* (2013.01)

(58) Field of Classification Search
None
See application file for complete search history.

(56) References Cited

U.S. PATENT DOCUMENTS

| | | | |
|---|---|---|---|
| 5,875,352 A | * | 2/1999 | Gentry et al. .................. 710/23 |
| 6,223,256 B1 | * | 4/2001 | Gaither ........................ 711/134 |
| 6,353,869 B1 | * | 3/2002 | Ofer et al. .................... 710/200 |
| 7,055,004 B2 | | 5/2006 | Dement et al. |
| 2001/0052054 A1 | | 12/2001 | Franke et al. |
| 2004/0143706 A1 | | 7/2004 | Johns et al. |
| 2004/0199725 A1 | | 10/2004 | Khawand |

(Continued)

FOREIGN PATENT DOCUMENTS

| | | |
|---|---|---|
| CN | 1268704 A | 10/2000 |
| EP | 0568221 A1 | 11/1993 |

(Continued)

OTHER PUBLICATIONS

Hashing, Computer Dictionary, 1-page, 2001;—U.S. Appl. No. 13/425,197.

Primary Examiner — Jared Rutz
Assistant Examiner — Marwan Ayash
(74) Attorney, Agent, or Firm — Steven L. Nichols; Fabin VanCott

(57) ABSTRACT

A cache memory device includes a plurality of cache areas, each the cache area comprising a plurality of entries. The cache memory device is configured to maintain a separate lock attribute for each the cache area and temporarily assign possession of a lock attribute for a particular the cache area to a processor thread attempting to update the particular the cache area, the processor thread being unable to update the particular the cache area without possession of the lock attribute for the particular the cache area.

6 Claims, 13 Drawing Sheets

(56) References Cited

U.S. PATENT DOCUMENTS

| | | |
|---|---|---|
| 2007/0078848 A1 | 4/2007 | Sarreen et al. |
| 2007/0150658 A1* | 6/2007 | Moses et al. ............... 711/130 |
| 2007/0271450 A1* | 11/2007 | Doshi et al. ............... 712/245 |
| 2009/0144519 A1 | 6/2009 | Cadrescu et al. |
| 2010/0114849 A1 | 5/2010 | Kingsbury et al. |

FOREIGN PATENT DOCUMENTS

| | | |
|---|---|---|
| EP | 1098249 A1 | 5/2001 |
| JP | 04239944 | 8/1992 |

\* cited by examiner

MANAGING PROCESSOR THREAD ACCESS TO CACHE MEMORY USING LOCK ATTRIBUTES

CROSS-REFERENCE TO RELATED APPLICATIONS

The present application claims priority under 35 U.S.C. §371 to Chinese Patent Application No. 200910225833.7, the entire of disclosure of which is incorporated herein by reference.

BACKGROUND

The present invention relates to computer storage, particularly, to a method, device and storage system for building and allowing cache access.

Cache memory is memory disposed between the central processing unit (CPU) of a computing system and the main memory of the computing system. Due to the location and speed of cache memory in a computing system architecture, cache memory is often used to hold the most frequently accessed data and program codes during the execution of a program. Threads within the computing system may directly interact with the cache, thereby avoiding the need to access information from the relatively slower main memory or hard disk.

In some systems, multiple threads from a processor may request access to cache memory in order to update the cached data. This is especially true with multi-core processors. However, if two separate threads are permitted to simultaneously update the same data in the cache memory, the integrity of the data may be crippled. On the other hand, delays in cache access may slow down the performance of the computing system.

BRIEF SUMMARY

A method of managing access to a cache memory, includes dividing the cache memory into multiple cache areas, each cache area including multiple entries; and providing at least one separate lock attribute for each cache area such that only a processor thread having possession of the lock attribute corresponding to a particular cache area can update that cache area.

A cache memory includes multiple cache areas, each cache area having multiple entries. The cache memory device is configured to maintain a separate lock attribute for each cache area and temporarily assign possession of a lock attribute for a particular cache area to a processor attempting to update that cache area, where the processor thread is unable to update said cache area without possession of the lock attribute for the cache area.

A method of updating a cache includes, in a cache memory device having multiple cache areas, each cache area having multiple entries, receiving a multiple substantially concurrent requests to update a particular cache area from multiple processor threads; granting possession of a lock attribute corresponding to that cache area to a selected processor thread; allowing the selected processor thread to update the cache area only while the selected processor thread retains possession of the lock attribute corresponding to the cache area; and retracting possession of the lock attribute corresponding to the cache area from the selected processor thread.

A cache memory device includes multiple cache areas, each cache area having multiple entries. The cache memory device is configured to maintain a separate lock attribute for each cache area; receive multiple substantially concurrent requests to update a particular cache area from multiple processor threads; grant possession of the lock attribute corresponding to that cache area to a selected processor thread; allow the selected processor thread to update the cache area only while the selected processor thread retains possession of the lock attribute corresponding to the cache area; and retract possession of the lock attribute corresponding to the cache from the selected processor thread.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
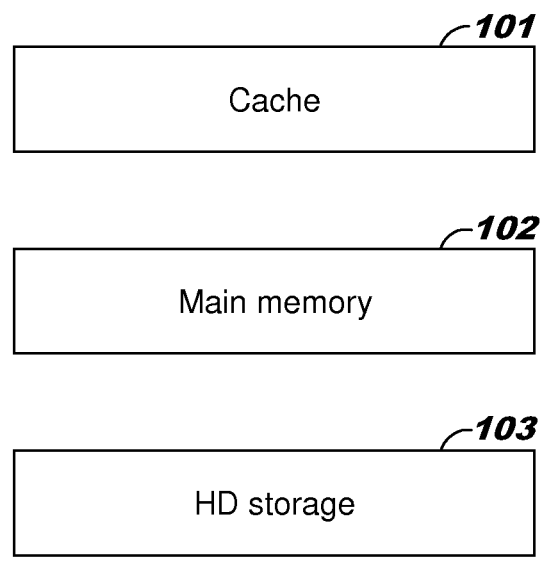
FIG. 1 shows a diagram of an illustrative hierarchical storage architecture of a computing system, according to one example of principles described herein.

The present specification discloses methods and systems of managing access to a cache memory. In particular, the present specification discloses methods and systems related to cache memory divided into multiple cache areas, each cache area having a separate unique key attribute. By requiring a processor thread to possess the key to a particular cache area prior to modifying data stored in that cache area, the simultaneous modification of the same data by different processor threads can be avoided. However, by associating a key with each cache area rather than just providing a key for the cache itself, multiple processor threads may concurrently modify different cache areas without risking the integrity of the cache data.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 shows a diagram of the hierarchical storage architecture in a computer system. In FIG. 1, the hard disk storage denoted by 103 is mainly used to store infrequently accessed data and program codes in the computer system; the main memory denoted by 102 is used to store some data and program codes that are often accessed in the computer system; the cache represented by 101 and normally located between the CPU and main memory is used to hold the most frequently accessed data and program codes during the execution of computer. Threads within the computer system may directly contact with the cache 101, avoiding access information from the relatively slower main memory or hard disk.

Cache is a very important component in almost all high performance computer systems, and has gained a wide use in database environments, especially in remote database environments. In the case of remote database access, the speed of remote stations accessing to central station database is very slow, hence it is necessary to build cache on each remote station to hold those frequently used data.

Currently, cache is pervasively used by many Web 2.0 service providers. It may be desirable to design a high performance cache architecture for parallel and distributed environments, since any performance improvement to cache will greatly reduce the running cost of computer systems, thus advancing the development of IT industry significantly.

With the increasing prevalence of multi-core technique, more and more threads can now be executed in a single computer system. Before discussing the access of multiple parallel threads to a single cache in the prior art, the organization and replacement policy of cache entries will be introduced at first.

Figure 2:
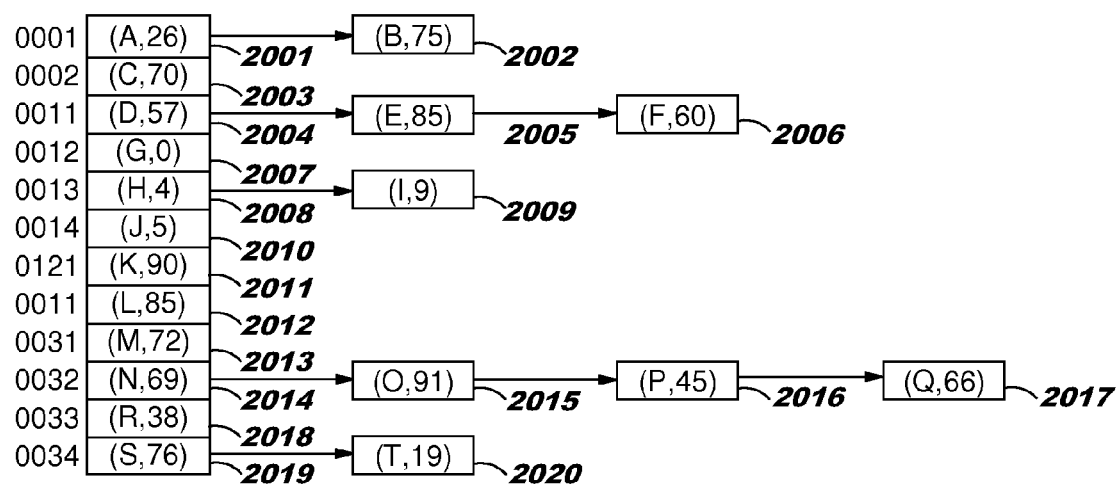
FIG. 2 shows an illustrative cache memory entry organization in the form of a hash table according to one example of principles described herein.

FIG. 2 shows a prior art cache entry organization in the form of hash table. Although the use of hash tables has been found by some to be the most efficient method for cache entry organization, other methods are also applicable. FIG. 2 shows 20 entries 2001-2020, each of which stores a pair consisting of a keyword and a value. For example, in the entry 2001, A is the keyword and 26 is the value corresponding to the keyword. FIG. 2 shows a chaining hash table in which entries with the same hash code are arranged in a chain. As shown in FIG. 2, the entries 2001 and 2002 have the same hash code 0001, the entry 2003 has a hash code 0002 alone, the entries 2004, 2005 and 2006 share a hash code 0011, and so on. It will be noted that FIG. 2 only shows the organization relationship of the cache entries within the hash table, but not the physical location relationship of those entries. For example, the entries 2001 and 2002 are adjacent as shown in FIG. 2 but may actually have nonadjacent storage locations.

For example, when a thread sends an access request containing a keyword F, a hash code 0011 can be obtained through inputting the keyword F into a hash function. It can be known that the entry containing the keyword F is linked in the chain corresponding to the hash code 0011, which includes three entries 2004, 2005 and 2006 in this example. Through keyword comparison, it can be known that the entry containing the keyword F is the entry 2006, the value contained in the entry 2006 is 60. If a fetch request is sent by the thread, the value 60 will be fetched; if a save request is sent by the thread, the value in the entry will be overwritten with the preset value in the access request.

Figure 3:
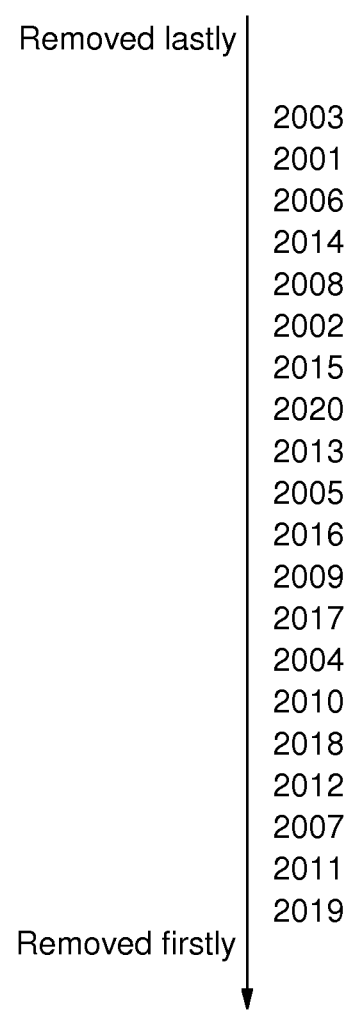
FIG. 3 shows an illustrative replacement policy of cache memory entries, according to one example of principles described herein.

FIG. 3 shows a replacement policy of the cache entries in FIG. 2 when the cache is full. As shown in FIG. 3, when the cache is full, the data stored in the entry 2019 is removed at first, then the data stored in the entry 2011 is removed . . . , and the data stored in the entry 2003 is removed at last.

Figure 4:
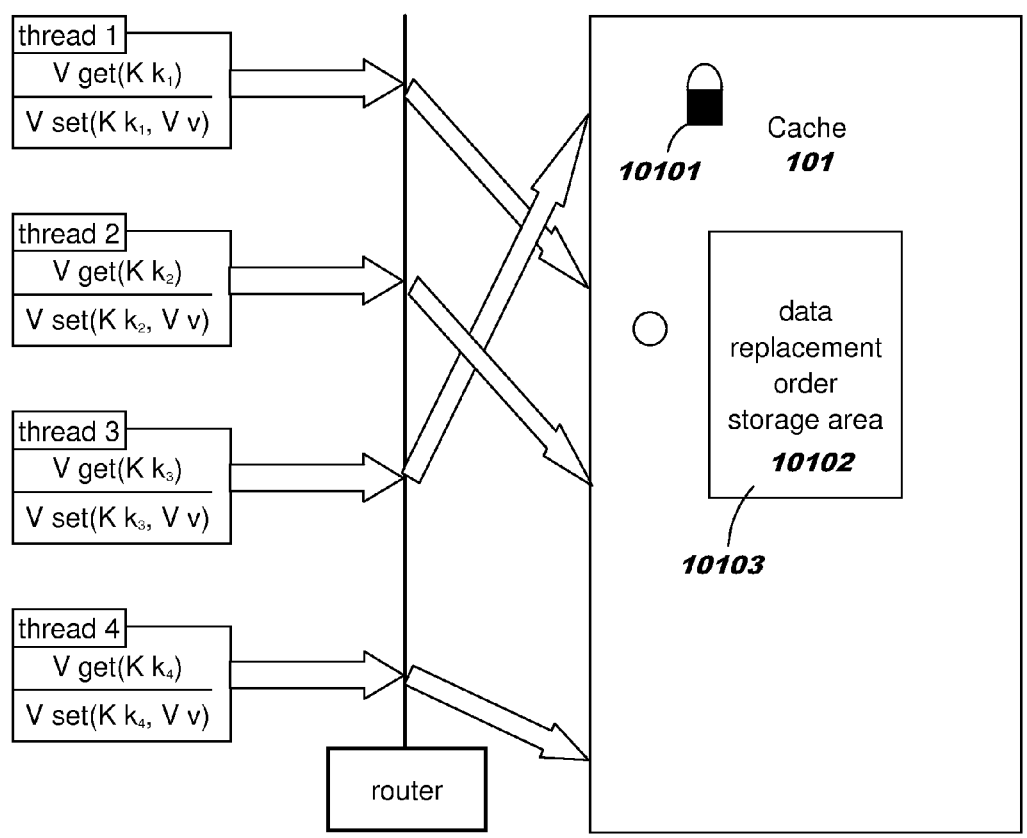
FIG. 4 shows a block diagram of an illustrative method of multiple parallel processing threads accessing a common cache memory, according to one example of principles described herein.

FIG. 4 shows a block diagram of a solution for accessing a same cache from multiple parallel threads in prior art. In FIG. 4, the threads 1-4 access a single cache 101 through a router. The cache 101 manages its entries in hash table as shown in FIG. 2 and includes a data replacement order storage area 10102 for storing the replacement policy of cache entries when the cache is full, as shown in FIG. 3. The cache 101 comprises a first lock 10101 for accessing the data stored in each entry, and a second lock 10103 for updating the entry replacement order when the cache is full.

Figure 5:
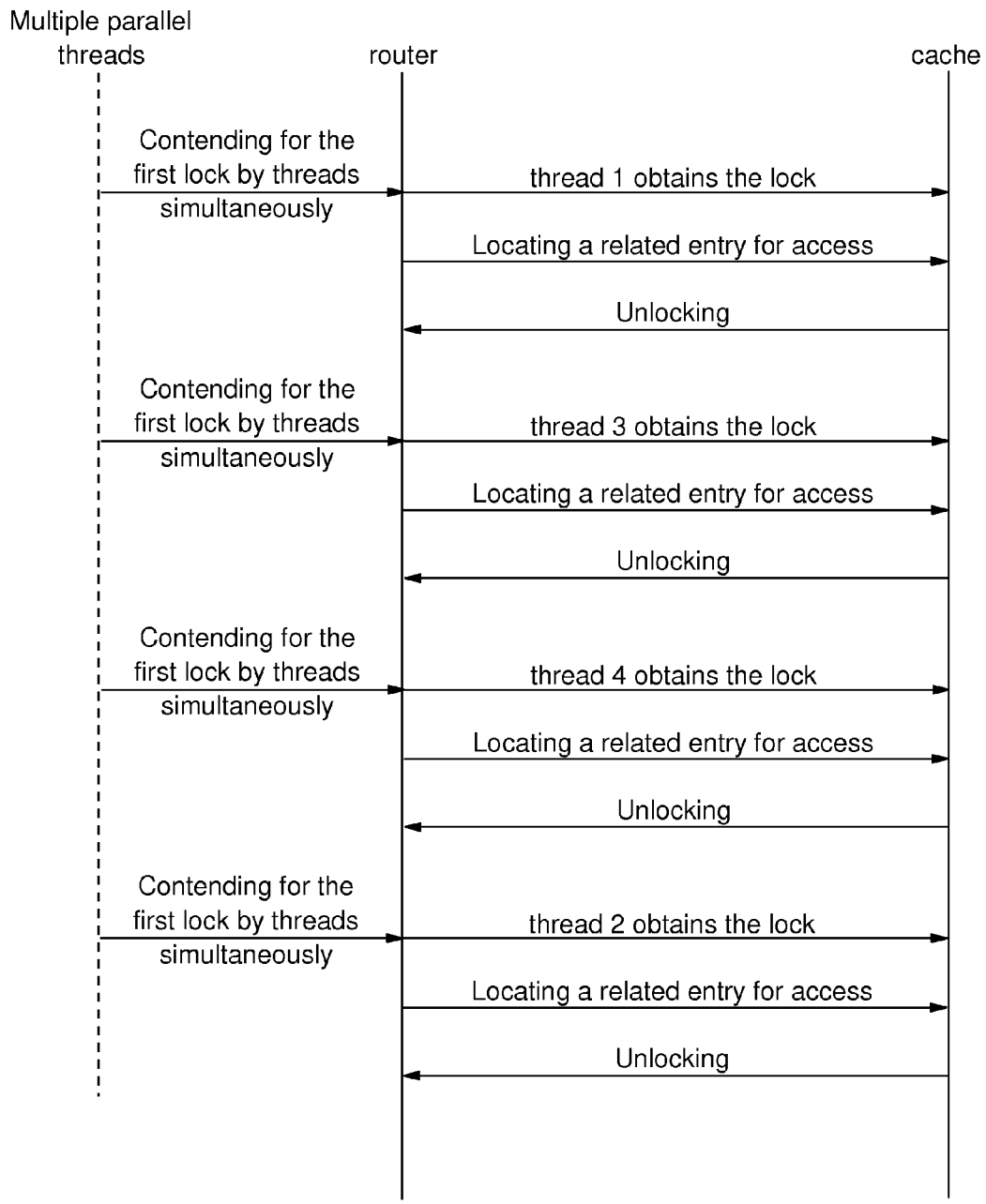
FIG. 5 shows an illustrative progress of multiple parallel processor threads contending for a first lock to access cache data, according to one example of principles described herein.

FIG. 5 illustrates the progress in which those threads of FIG. 4 contend for a first lock to access the cache 101. Initially, each thread contends for the first lock simultaneously. As a random result, the thread 1 obtains the first lock and is allowed to access the cache. Then, the thread 1 locates the entry corresponding to the keyword for access as described above. After its access, the thread 1 unlocks the first lock, enabling the next round of competition for the first lock by threads. As a random result, the thread 3 obtains the first lock . . . , and so on.

Figure 6:
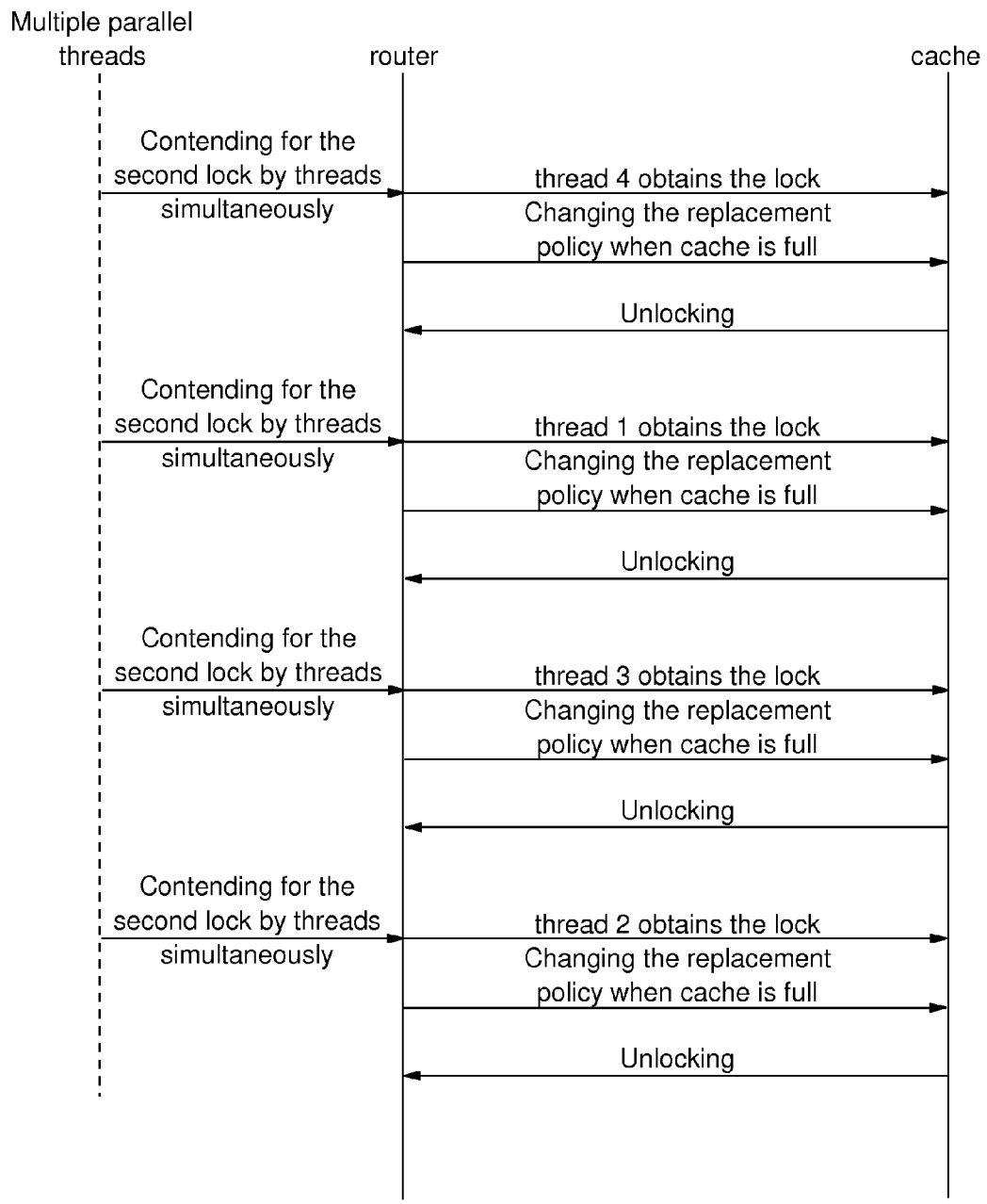
FIG. 6 shows an illustrative progress of multiple parallel processor threads contending for a second lock to update an entry replacement order in a cache memory, according to one example of principles described herein.

If a thread wants to change the entry replacement order when the cache is full, it must compete for a second lock. FIG. 6 illustrates the progress in which those threads of FIG. 4 contend for a second lock to update the entry replacement order when the cache is full. Initially, each thread competes for the second lock simultaneously. As a random result, the thread 4 obtains the second lock and is allowed to update the entry replacement order when the cache is full. Next, the thread 4 changes the entry replacement order when the cache is full as shown in FIG. 3. Upon the change of the entry replacement order, the thread 4 unlocks the second lock, enabling the next round of competition for the second lock by threads. As a random result, thread 1 obtains the second lock . . . , and so on.

It can be known from FIGS. 5 and 6, when a thread has obtained a lock to access to data or update the entry replacement order when the cache is full, none of other threads can perform any operations on the cache. Furthermore, lock contention takes a large amount of time. The ASM codes involved in the synchronization of lock contention may take a majority of the total execution time. The more the threads exist, the higher the synchronization overhead is imposed. Multi-thread synchronization has become the biggest overhead with respect to the performance of cache, thus affecting the scalability of cache on multi-core platforms.

Figure 7:
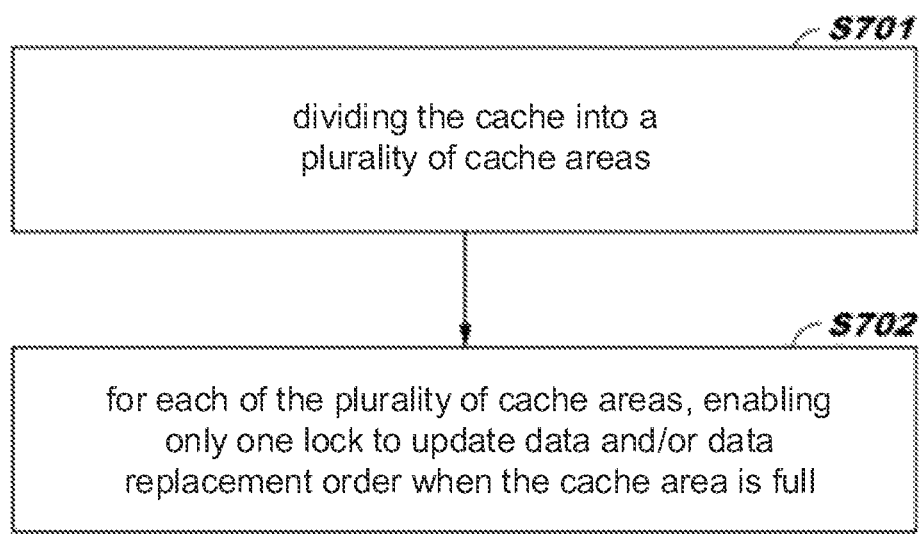
FIG. 7 shows a flowchart of an illustrative method of building a highly scalable cache memory according to one embodiment of the invention, according to one example of principles described herein.

As shown in FIG. 7, a method for building a highly scalable cache according to an embodiment of the invention comprises: at block S701, dividing the cache into a plurality of cache areas; at block S702, for each of the plurality of cache areas, using only one lock to update data and/or data replacement order when the cache area is full.

According to one embodiment of the invention, each cache area includes multiple entries, each of which contains a pair consisting of a keyword and a value, and pointers pointing to the previous and next entries in the data replacement order when the cache area is full. Here, the update to data refers to the update to the pair consisting of a keyword and a value, and the update to data replacement order when the cache area is full refers to the update to the pointers.

According to another embodiment of the invention, each cache area includes multiple entries, each of which contains a pair consisting of a keyword and a value, and a number representing the data replacement order when the cache area is full. Here, the update to data refers to the update to the pair consisting of a keyword and a value, and the update to data replacement order when the cache area is full refers to the update to the number.

According to another embodiment of the invention, each cache area includes multiple entries, each of which contains a pair consisting of a keyword and a value. The multiple entries are physically arranged in data replacement order when the cache area is full. A physical arrangement controller is set up for each cache area to physically arrange the entries in the cache area. The update to data refers to the update to the pair consisting of a keyword and a value, and the update to data replacement order when the cache area is full is accomplished by the physical arrangement controller.

Figure 8:
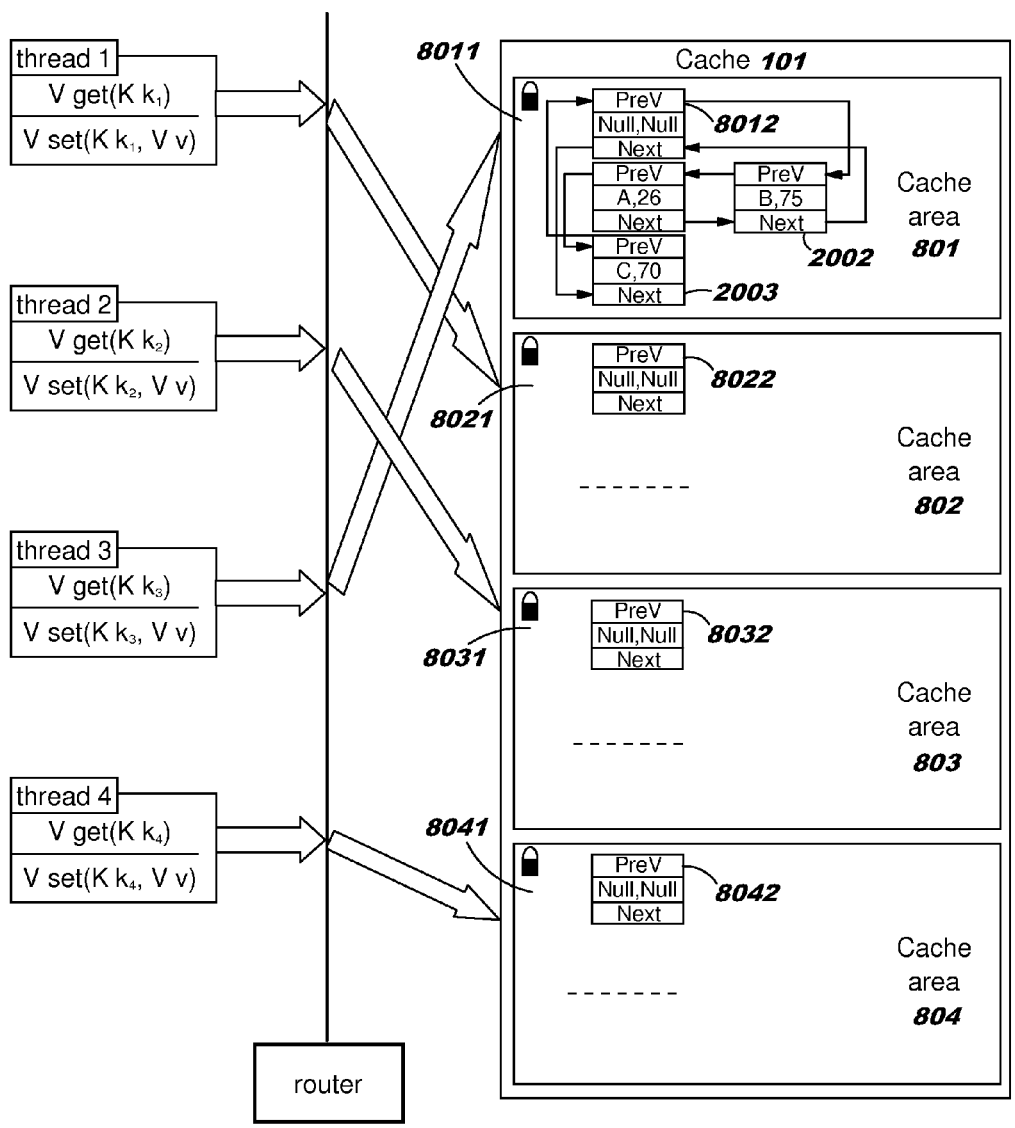
FIG. 8 is a block diagram showing an illustrative method of multiple parallel processor threads accessing a common cache memory, according to one example of principles described herein.

FIG. 8 is a block diagram showing the solution of accessing the same cache from multiple parallel threads according to the first embodiment of the invention. In FIG. 8, the cache 101 is divided into four cache areas 801, 802, 803 and 804. The rule of the division is, for example, dividing the entries with some identical bits from the beginning of their hash codes into one cache area. For example, in FIG. 2, entries 2001-2003 having the same first 3 bits of 000 in their hash codes are divided into the cache area 801, entries 2004-2010 having the same first 3 bits of 001 in their hash codes are divided into the cache area 802, entries 2011-2012 having the same first 3 bits of 002 in their hash codes are divided into the cache area 803, and entries 2013-2020 having the same first 3 bits of 003 in their hash codes are divided into the cache area 804. However, the invention is not limited to such a division rule.

When a certain thread sends a request for accessing the data in cache 101 and/or updating data replacement order, a hash code is calculated based on the keyword in the request, and a cache area is selected based on a certain bits from the beginning of the hash code (for example, the cache area 801 is selected if the calculated hash code is 0002). Then, it is determined whether there are multiple threads attempting to access the selected cache area. If so, these threads may contend for the lock and the thread capturing the lock is allowed to access the cache area.

In FIG. 8, cache areas 801-804 have locks 8011, 8021, 8031 and 8041 respectively, for updating data in the respective cache area and/or data replacement order when the cache area is full. Each entry of cache areas 801-804 stores a pair consisting of a keyword and a value, and pointers pointing to the previous and next entries in the data replacement order when the cache area is full. Cache areas 801-804 also include head entries 8012, 8022, 8032, 8042 for storing pointers pointing to the first and last entries in the data replacement order when the cache area is full. As shown in FIG. 8, the next entry pointed by the head entry 8012 in the cache area 801 is entry 2003, the next entry pointed by the pointer in the entry 2003 is the entry 2001, the next entry pointed by the pointer in the entry 2001 is the entry 2002, and the pointer in the entry 2002 points back to the head entry 8012. Hence, in cache area 801, when the cache area is full, the data in the entry 2002 is removed at first, and then the data in the entry 2001 is removed, and the data in the entry 2003 is removed at last.

When the thread capturing the lock accesses the cache area, if the request is a request for data update, the thread will change the pair consisting of keyword and value in the corresponding entry; if the request is a request for updating data replacement order, the thread will change the pointers specifying the data replacement order in each entry.

When the thread holding the lock has completed its access, it unlocks the lock. For this cache area, the next round of lock contention is performed.

Figure 9:
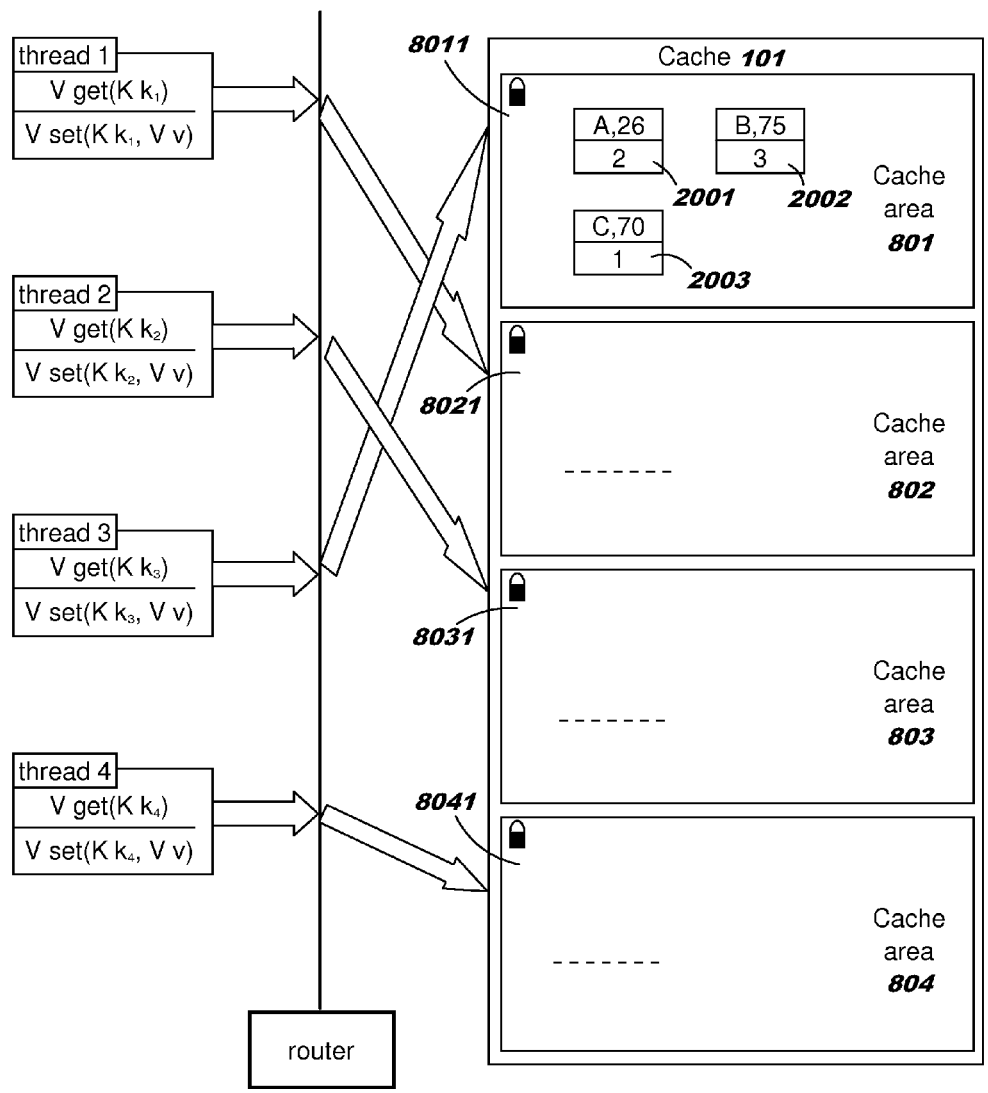
FIG. 9 is a block diagram showing an illustrative method of multiple parallel processor threads accessing a common cache memory, according to one example of principles described herein.

FIG. 9 is a block diagram showing the solution of accessing the same cache from multiple parallel threads according to the second embodiment of the invention. The difference between the first and second embodiments lies in that the second embodiment uses a number instead of pointers to represent the data replacement order when the cache area is full. As shown in FIG. 9, the entry 2001 is numbered as 2, the entry 2002 is numbered as 3, and the entry 2003 is numbered as 1. Hence, as the cache area is full, the data of entry 2002 is removed at first (because it has the biggest number), and then the data of entry 2001 is removed, and the data of entry 2003 is removed at last.

Therefore, when the thread capturing the lock requests to change the data replacement order when the cache area is full, it only needs to change the numbers of the entries.

Other parts of the second embodiment are similar to those of the first embodiment.

Figure 10:
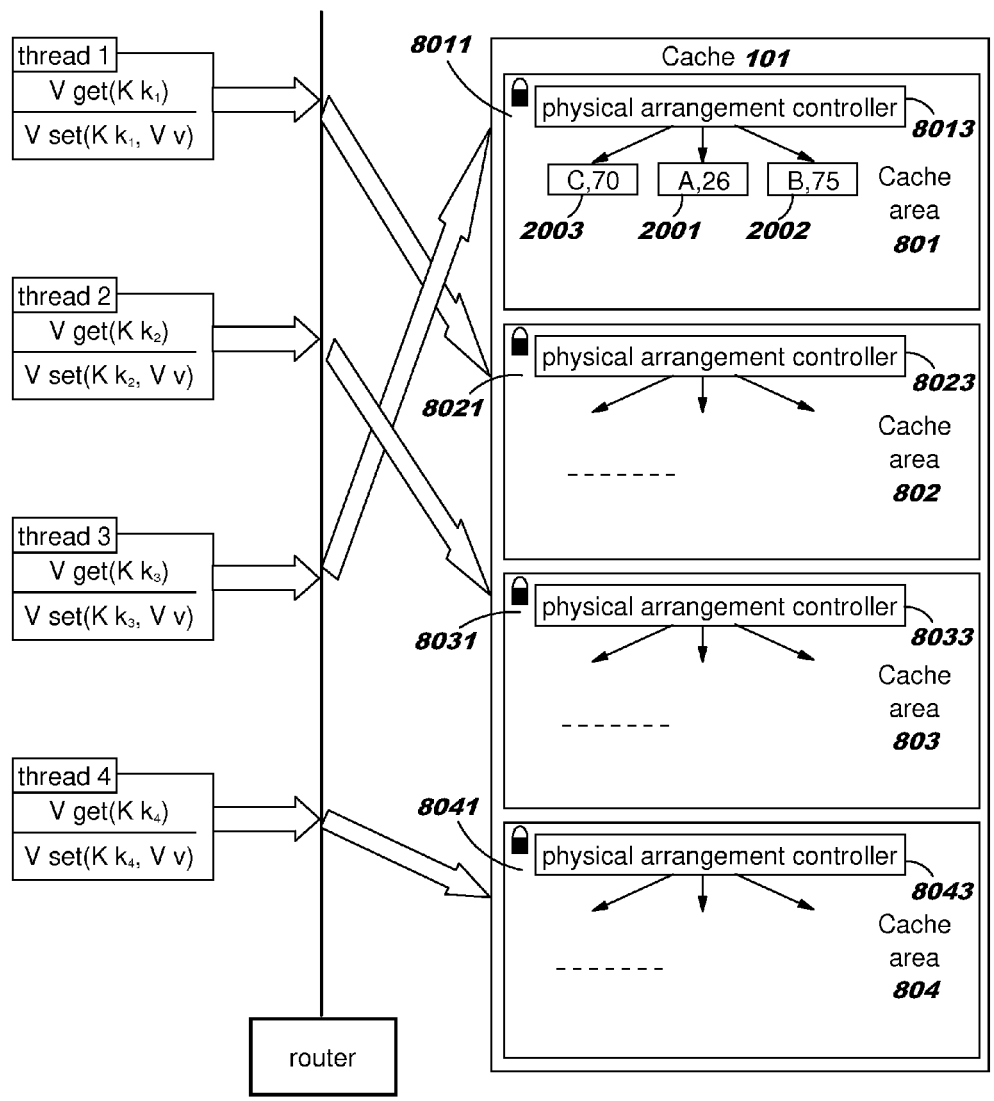
FIG. 10 is a block diagram showing an illustrative method of multiple parallel processor threads accessing a common cache memory, according to one example of principles described herein.

FIG. 10 is a block diagram showing the solution of accessing the same cache from multiple parallel threads according to the third embodiment of the invention. The third embodiment is different from the first embodiment in that it uses the actual physical arrangement of entries instead of pointers to represent the data replacement order when the cache area is full. As shown in FIG. 10, in the cache area 801, three entries are physically arranged in the order of 2003, 2001 and 2002. Hence, when the cache area is full, the data of the entry 2002 is removed at first (since it is the last one), then the data of the entry 2001 is removed and the data of the entry 2003 is removed at last.

The cache areas 801, 802, 803, 804 have physical arrangement controllers 8013, 8023, 8033, 8043 respectively, which are used to physically arrange the entries in the cache area. When the thread capturing the lock requests to change the data replacement order when the cache area is full, the physical arrangement controller physically rearranges the entries in this cache area according to the order specified in the request.

Other parts of the third embodiment are similar to those of the first embodiment.

Figure 11:
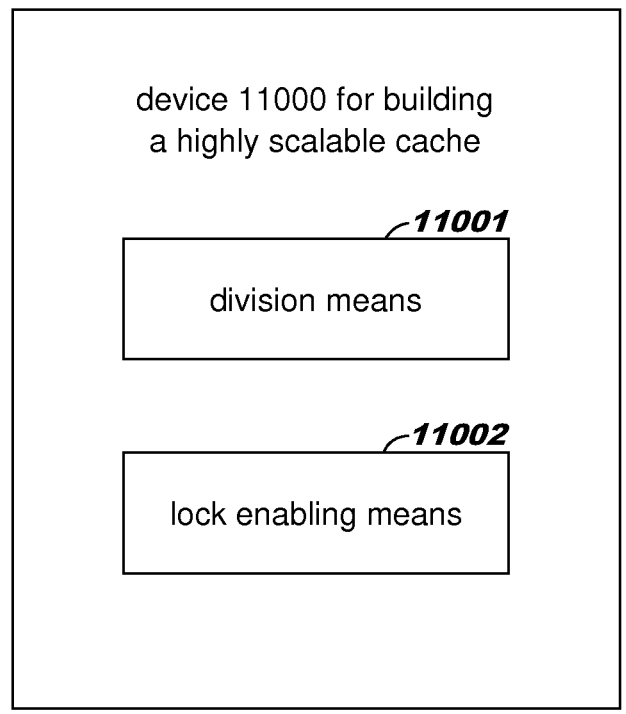
FIG. 11 is a block diagram of an illustrative device for building a highly scalable cache memory, according to one example of principles described herein.

FIG. 11 is a block diagram of the device 11000 for building a highly scalable cache according to an embodiment of the invention. The device 11000 comprises: a division means 11001 for dividing the cache into a plurality of cache areas; a lock enabling means 11002 for enabling only one lock for each of the plurality of cache areas to update data and/or data replacement order when the cache area is full.

Figure 12:
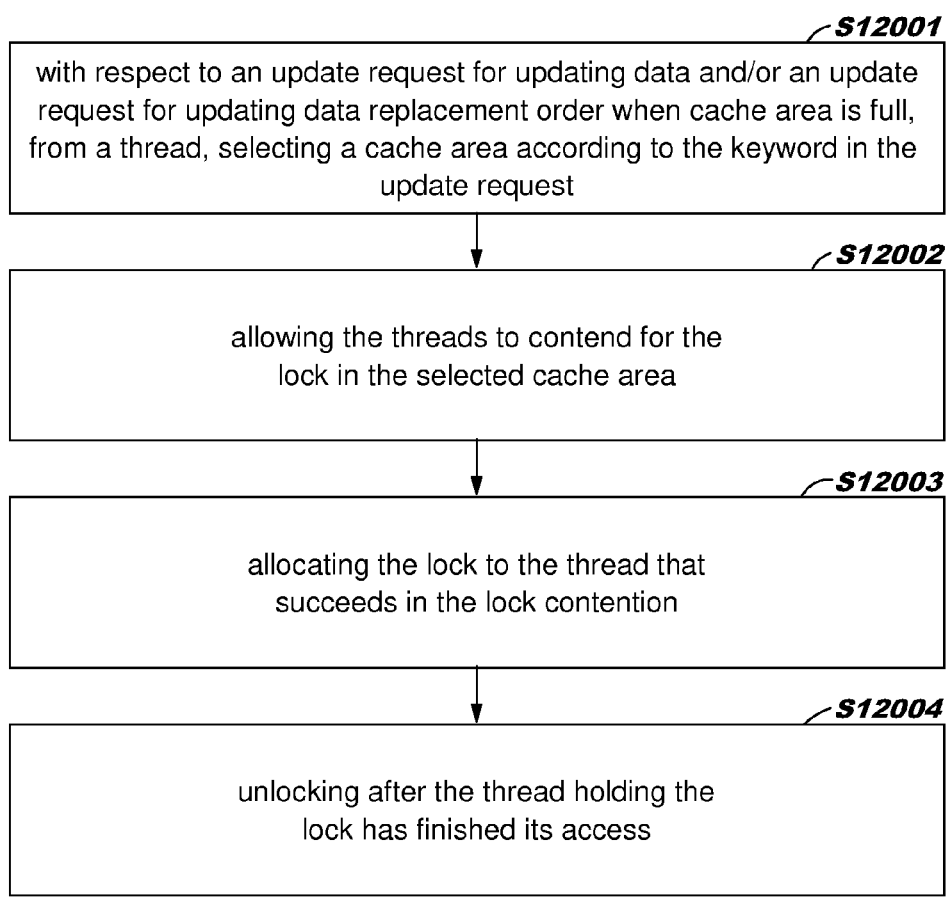
FIG. 12 is a flowchart of an illustrative method of managing access to a cache memory, according to one example of principles described herein.

FIG. 12 is a flowchart of a method for allowing simultaneous access to a cache from multiple threads according to an embodiment of the invention. The cache comprises a plurality of cache areas, and each of the plurality of cache areas contains only one lock to update data and/or data replacement order when the cache area is full. The method comprises: at block S12001, with respect to an update request for updating data and/or an update request for updating data replacement order when cache area is full, from a thread, selecting a cache area according to the keyword in the update request; at block S12002, allowing the threads to contend for the lock in the selected cache area; at block S12003, allocating the lock to the thread that succeeds in the lock contention, during the lock is held, only the thread holding the lock is allowed to access the selected cache area; at block S12004, unlocking after the thread holding the lock has finished its access.

Figure 13:
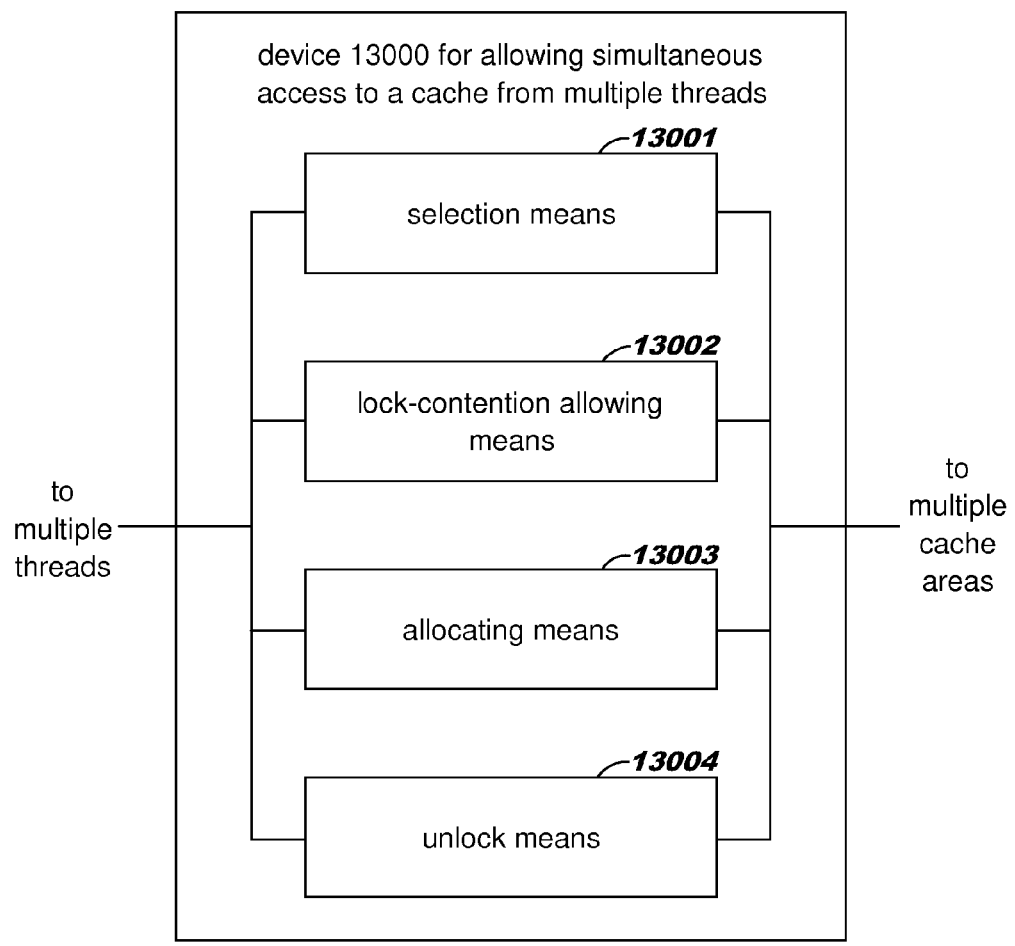
FIG. 13 is a block diagram of an illustrative device for managing access to a cache memory, according to one example of principles described herein.

FIG. 13 is a block diagram of a device for allowing simultaneous access to a cache from multiple threads according to an embodiment of the invention. The device 13000 comprises: a selection means 13001 for, with respect to an update request for updating data and/or an update request for updating data replacement order when cache area is full, from a thread, selecting a cache area according to the keyword in the update request; a lock-contention allowing means 13002 for allowing the threads to contend for the lock in the selected cache area; an allocating means 13003 for allocating the lock to the thread that succeeds in the lock contention, during the lock is held, only the thread holding the lock is allowed to access the selected cache area; an unlock means 13004 for unlocking after the thread holding the lock has finished its access.

Furthermore, as mentioned above, a storage system is also provided in this invention (corresponding to the cache 101 in FIGS. 8-10), which may comprise multiple storage units (corresponding to the cache areas 801-804 in FIGS. 8-10). Each storage unit comprises: a lock unit (corresponding to the locks 8011, 8021, 8031, 8041 in FIGS. 8-10) for updating data and/or the data replacement order when the storage unit is full; and multiple storage sections (corresponding to the entries 2001, 2002, 2003 in FIGS. 8-10).

According to one embodiment of this invention (as shown in FIG. 8), each storage section comprises: a sub storage section for storing a pair consisting of a keyword and a value, and a sub storage section for storing pointers pointing to the previous and next storage sections in the data replacement order when the storage unit is full.

According to another embodiment of this invention (as shown in FIG. 9), each storage section comprises: a sub storage section for storing a pair consisting of a keyword and a value, and a sub storage section for storing a number representing the data replacement order when the storage unit is full.

According to still another embodiment of this invention (as shown in FIG. 10), each storage section comprises a sub storage section for storing a pair consisting of a keyword and a value; and each storage unit comprises a physical arrangement controller for physically arranging the storage sections within the storage unit in the data replacement order when the storage unit is full.

The foregoing description of the preferred embodiments of the present invention has been presented for the purpose of illustration. It is not intended to be exhaustive or to limit the invention to the precise forms disclosed. Obviously, modifications or variations are possible in light of the above teachings. Such modifications or variations obvious to those skilled in the art are considered to fall within the scope of the present invention defined by the claims appended.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

The invention claimed is:

1. A cache memory device comprising a plurality of cache areas, each said cache area comprising a plurality of entries; said cache memory device being configured to:
   divide said plurality of cache areas into a plurality of multiple entries, in which:
      the multiple entries of a particular cache area share a plurality of identical bits at the beginning of a hash code corresponding to each entry;
      each entry comprises a keyword and a value associated with said keyword; and
      each cache area comprises a representation of a data replacement order for said cache area;
   maintain a separate lock attribute for each said cache area;
   receive a plurality of substantially concurrent requests to update a particular said cache area from a plurality of processor threads;
   grant possession of a said lock attribute corresponding to the particular said cache area to a selected said processor thread in said plurality of processor threads;
   allow multiple processor threads to simultaneously possess separate lock attributes for separate cache areas;
   allow said selected processor thread to update the particular said cache area only while said selected processor thread retains possession of said lock attribute corresponding to the particular said cache area, wherein updating said cache area comprises:
   updating a data replacement order for said cache area by updating a physical arrangement of said multiple entries in said cache area; and
   updating an entry in said cache area by updating at least one of said keyword and said value; and
   retract possession of said lock attribute corresponding to the particular said cache area from said selected processor thread.

2. The cache memory device of claim 1, said cache memory device being further configured to allow said multiple processor threads to concurrently update said separate cache areas.

3. The cache memory device of claim 1, wherein said data replacement order for said cache area is determined by a physical arrangement of said entries in said cache area.

4. The cache memory device of claim 1, comprising:
   for each said cache area, a first said lock attribute corresponding to said entries in said cache area and a second said lock attribute corresponding to said data replacement order;
   wherein updating said cache area comprises at least one of: updating a said entry in said cache area and updating a data replacement order for said cache area;
   wherein said processor thread can only update said entries in said cache area if said processor thread possesses said first lock attribute for said cache area; and
   wherein said processor thread can only update said data replacement order for said cache area if said processor thread possesses said second said lock attribute for said cache area.

5. The cache memory device of claim 1, further comprising a data replacement order storage area for storing a replacement policy of cache entries when said cache area is full.

6. The cache memory device of claim 1, wherein said cache area further comprises head entries for storing points pointing to the first and last entries in a data replacement order.

* * * * *